United States Patent
Arai

(10) Patent No.: US 6,435,296 B1
(45) Date of Patent: *Aug. 20, 2002

(54) TORQUE DETECTOR AND CONTROLS FOR PROHIBITING THE OPERATION OF AN ELECTRIC MOTOR ON A HYBRID VEHICLE WHEN THE DRIVING TORQUE OF THE VEHICLE EXCEEDS A PREDETERMINED VALUE DURING START-UP

(75) Inventor: Kentarou Arai, Saitama-ken (JP)

(73) Assignee: Honda Giken Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 570 days.

(21) Appl. No.: 08/633,564

(22) Filed: Apr. 17, 1996

(30) Foreign Application Priority Data

Jun. 19, 1995 (JP) .............................................. 7-151514

(51) Int. Cl.[7] .......................... B60K 31/02; B60L 11/14
(52) U.S. Cl. ...................... 180/243; 180/65.2; 180/65.4; 180/65.6; 180/247
(58) Field of Search ............................... 180/243, 65.2, 180/65.4, 65.6, 247

(56) References Cited

U.S. PATENT DOCUMENTS

| | | | | | |
|---|---|---|---|---|---|
| 4,335,429 A | * | 6/1982 | Kawakatsu | ................ | 180/65.2 |
| 4,558,414 A | * | 12/1985 | Sakakiyama | ................ | 180/247 |
| 5,125,469 A | * | 6/1992 | Scott | ........................ | 180/65.2 |
| 5,368,120 A | * | 11/1994 | Sakai et al. | ................ | 180/65.2 |
| 5,489,001 A | * | 2/1996 | Yang | ........................ | 180/65.2 |
| 5,492,189 A | * | 2/1996 | Kriegler et al. | ............ | 180/65.2 |
| 5,495,906 A | * | 3/1996 | Furutani | .................... | 180/65.2 |
| 5,775,449 A | * | 7/1998 | Morota et al. | ............. | 180/65.2 |

FOREIGN PATENT DOCUMENTS

| | | |
|---|---|---|
| DE | 35 42 059 | 6/1987 |
| DE | 36 36 260 | 5/1988 |
| DE | 38 07 899 | 9/1989 |
| DE | 38 37 908 | 11/1990 |
| DE | 39 40 172 | 6/1991 |
| DE | 41 33 622 | 4/1993 |
| DE | 195 19 878 | 12/1995 |
| JP | 3-159502 | 7/1991 |

* cited by examiner

*Primary Examiner*—Eileen D. Lillis
(74) *Attorney, Agent, or Firm*—Armstrong, Westerman & Hattori, LLP

(57) ABSTRACT

Either the front wheels and rear wheels of a front wheel- and rear wheel-drive vehicle are driven by an engine and the other thereof are driven by an electric motor. The electric motor is operated when the vehicle starts. A driving torque detecting circuit detects a driving torque of wheels to be driven by the engine. Control circuit prohibits the operation of the electric motor when the driving torque to be detected at vehicle start-up exceeds a predetermined value.

2 Claims, 2 Drawing Sheets

TORQUE DETECTOR AND CONTROLS FOR PROHIBITING THE OPERATION OF AN ELECTRIC MOTOR ON A HYBRID VEHICLE WHEN THE DRIVING TORQUE OF THE VEHICLE EXCEEDS A PREDETERMINED VALUE DURING START-UP

BACKGROUND OF THE INVENTION

1. Field of the Invention

The present invention relates to a front wheel- and rear-wheel drive vehicle in which either the front wheels or the rear wheels are driven by an engine and the other thereof are driven by an electric motor.

2. Description of the Related Art

Conventionally, there is known a kind of vehicle in which an alternating-current (AC) motor is used as an electric motor and in which the electric motor is made operable over the entire range of vehicle speed through an inverter control (see Japanese Published Unexamined Patent Application No. 159502/1991).

In order to cover the entire range of the vehicle speed as in the above-described prior art, it is necessary to employ an electric motor having a large output. In addition, an inverter circuit becomes necessary, resulting in a higher cost.

By the way, if an arrangement is made to operate the electric motor only at the time of starting the vehicle in order to limit the purpose of using the electric motor to the assistance of the vehicle's starting, it is possible to use an inexpensive direct-current (DC) brush motor such is used as a self-starting motor or the like. However, if the DC brush motor is used always at the time of starting the vehicle, the durability of the brush will become a problem.

In order to deal with this kind of disadvantage, the following arrangement may be considered. Namely, there is provided a switch which is operated when the driver has determined the road to be slippery, and the electric motor is operated when the vehicle starts in a condition in which the switch is switched on. Other wise, slipping of the wheels to be driven by the engine is detected based on a difference in revolution speeds between the front wheels and the rear wheels. The electric motor is operated when those wheels give rise to slipping at the time of starting the vehicle.

However, the former system is troublesome because the operation of the switch becomes necessary. In the latter system, on the other hand, when the vehicle starts on a road surface such as a gravel road or the like having a high coefficient of friction, the electric motor is also operated when the wheels to be driven by the engine spin and throw gravel so that there occurs a difference in revolution speeds between the front wheels and the rear wheels. In such a case, as soon as the gavel is thrown from under the wheels, the vehicle can start even if the electric motor is not operated at all. It follows that the electric motor is inefficiently operated.

SUMMARY OF THE INVENTION

In view of the above-described disadvantages, the present invention has an object of providing a front wheel- and rear-wheel drive vehicle in which the inefficient operation of the electric motor is prevented and in which the electric motor is automatically operated to assist the starting of the vehicle on a road surface having a low coefficient of friction.

In order to attain the above and other objects, the present invention is a front wheel- and rear wheel-drive vehicle in which either the front wheels or the rear wheels are driven by an engine and the other thereof are driven by an electric motor, wherein the electric motor is operated when the vehicle starts, the vehicle comprising: means for detecting a driving torque of wheels to be driven by the engine; and control means for controlling to prohibit the operation of the electric motor when the driving torque to be detected during start-up of the vehicle exceeds a predetermined value.

When the vehicle starts at above a certain amount of acceleration, a driving torque above a certain amount or degree is applied to the wheels to be driven by the engine. Even when the wheels slip at the time of starting the vehicle on a road surface having a high coefficient of friction, a relatively large driving load is applied to the wheels due to the friction between the wheels and the road surface. The driving torque on the wheels therefore is above a certain amount.

On the other hand, when the wheels slip at the time of starting the vehicle on a road surface having a low coefficient of friction (e.g., on a slippery snowy road or the like), the driving load will not operate so much on the wheels, with the result that the driving torque of the wheels becomes small.

Therefore, if the predetermined value is set to such a lower limit value of the driving torque as will be operated on the wheels to be driven by the engine when the vehicle starts only by the drive of the wheels to be driven by the engine at an acceleration above a predetermined level, the driving torque of the wheels becomes less than the predetermined value when the wheels slip at the time of starting the vehicle on a road of low coefficient of friction. Consequently, the electric motor is operated to assist the starting of the vehicle. When the vehicle starts without giving rise to slipping of the wheels or when the wheels slip on a road surface having a high coefficient of friction, the driving torque of the wheels exceeds the predetermined value. Consequently, the electric motor is not operated.

In this manner, the electric motor is operated only in a condition in which the effect of starting assistance is desired. The inefficient operation of the electric motor can therefore be prevented.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE PREFERRED EXEMPLARY EMBODIMENT

Figure 1:
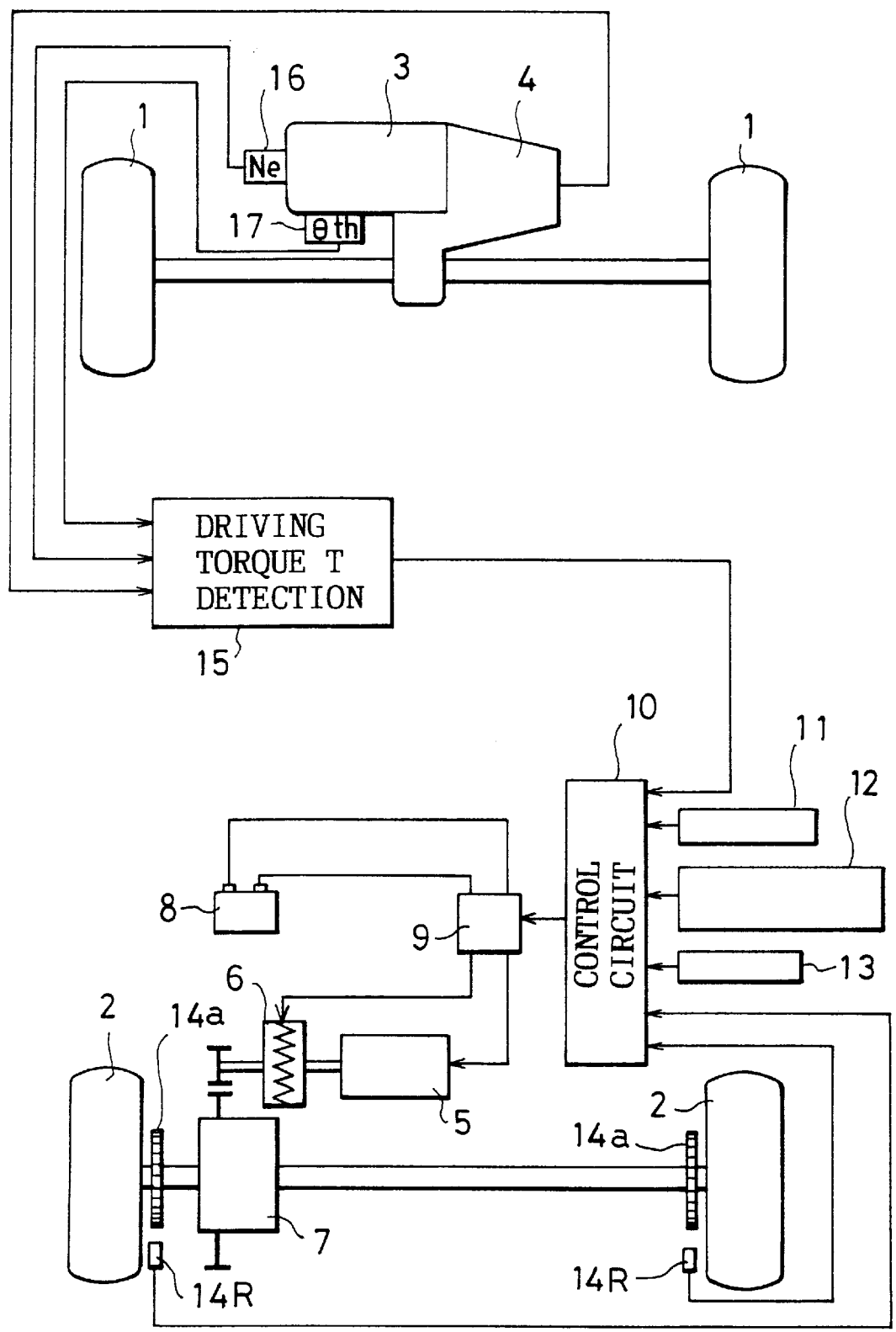
FIG. 1 is a skeleton diagram showing an embodiment of the present invention.

The embodiment in FIG. 1 shows a four-wheeled vehicle having a pair of front wheels 1 and a pair of rear wheels 2, respectively. The pair of right and left front wheels 1, 1 are driven by an engine 3 via a transmission 4. The pair of right and left rear wheels 2, 2 are driven by an electric motor 5 via a clutch 6 and a differential gear 7.

The electric motor 5 is constituted as a direct-current (DC) brush motor and is connected to a vehicle-mounted battery 8 via a switching circuit 9 in which is built a circuit for switching between forward running and reverse running. The switching circuit 9 is controlled to be switched on and switched off by a signal from the control circuit 10. When the switching circuit 9 is switched on, the electric motor 5 is operated and also the clutch 6 is engaged so that the rear wheels 2 can be driven by the electric motor 5. The circuit for switching between forward running and reverse running, which is built in the switching circuit 9, is controlled for switching in interlocking relationship with a shifting lever inside a compartment of the vehicle.

The control circuit 10 is made up of a microcomputer which receives the following input signals: i.e., a signal of a brake switch 11 for detecting whether a brake is off; a signal of an accelerator pedal switch 12 for detecting whether an accelerator pedal is on (i.e., depressed); a signal of a transmission sensor 13 for detecting whether the transmission 4 is in a neutral condition or not, e.g., a shift lever position sensor in an automatic transmission and a clutch switch in a manual transmission; and signals of wheel speed sensors 14R for detecting the revolution speeds of the rear wheels 2 in cooperation with pulser gears 14a which are mounted on the rear wheels 2. Further, there is provided a driving torque detecting circuit 15 for detecting the driving torque of the front wheels 1 so that a signal from the detecting circuit 15 can also be inputted into the control circuit 10.

The driving torque detecting circuit 15 receives the following input signals: i.e., a signal of a sensor 16 for detecting the revolution speed Ne of the engine 3; a signal of a sensor 17 for detecting a throttle opening degree $\Theta$th of the engine 3; and a signal indicating the present established speed stage of the transmission 4. An engine output torque is derived or obtained from Ne and $\Theta$th through map searching or the like. From this output torque and a gear ratio of the established speed, stage, the driving torque T of the front wheels 1 is computed. Here, even if the $\Theta$th is constant, the amount of Ne increases if the driving load of the front wheels 1 decreases. The output torque of the engine therefore decreases by the amount of this increase. By the way, there is well-known a vehicle having mounted thereon a system in which, based on the intention of a driver to be determined from an amount of depression of the accelerator pedal as well as the present driving conditions, the throttle opening degree, the fuel injection amount and the speed stage are electronically controlled. In this system, a target value of the driving torque of the wheels to be driven by the engine is computed by a control unit for the system. The engine and the transmission are thus controlled so that the driving torque becomes the target value. Therefore, this control unit may be used to serve the dual purpose of the driving torque detecting section. Further, a torque sensor may be mounted on a shaft of the front wheels 1 to thereby directly detect the driving torque of the front wheels 1.

Figure 2:
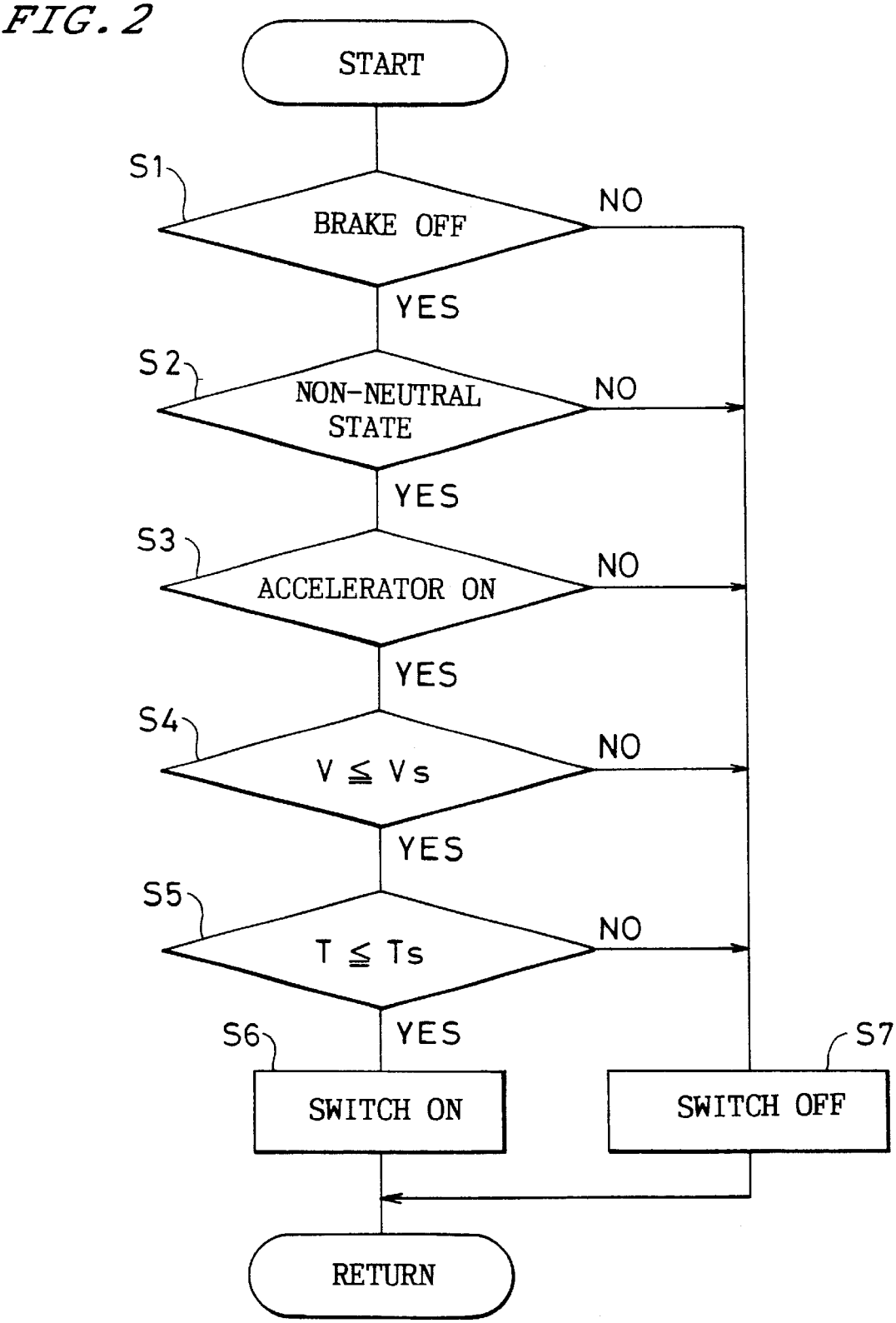
FIG. 2 is a flow diagram showing a control program of an electric motor.

The control flow chart in the control circuit 10 is shown in FIG. 2. When the following four conditions are met, the vehicle is considered to be in a state of being started, the four conditions being that the brake (inclusive of a parking brake and a side brake) is off or released (S1), that the transmission is in a non-neutral condition (S2), that the accelerator pedal is on (i.e., depressed) (S3), and that the revolution speeds of the rear wheels (vehicle speed) V are equal to or smaller than a predetermined value Vs (S4). When the vehicle is considered to be in a state of being started, a determination is made as to whether the driving torque T of the front wheels 1 detected at that specific time is equal to or less than a predetermined value Ts (S5). When T$\leq$Ts, the switching circuit 9 is switched on (S6). When the vehicle is not in a state of being started because any one of the above four conditions is not met, or if T>Ts even if the vehicle is in a state of being started, the switching circuit 9 is switched off (S7). The above-described predetermined value Ts is set to such a lower limit value of the driving torque as applied to the front wheels 1 at vehicle start-up only with the drive of the front wheels 1 at an acceleration above a predetermined level (e.g., 0.2 G). According to this arrangement, when the vehicle starts without giving rise to slipping of the front wheels 1, a condition of T>Ts is attained irrespective of the coefficient of friction $\mu$ on the road surface. Even if the front wheels 1 slip, a condition of T>Ts is attained on a road surface of higher coefficient of friction $\mu$. Thus, only when the front wheels 1 slip on the road surface of lower coefficient of friction $\mu$, the condition of T$\leq$Ts is satisfied, thereby operating the electric motor 5. Since the electric motor 5 is thus prevented from operating in an inefficient manner, there is no problem from the viewpoint of durability even if an inexpensive DC brush motor is used as the electric motor 5.

By the way, in the above-described embodiment, an arrangement is made that the driving torque of the front wheels 1 and the established speed stage are detected by the driving torque detecting circuit 15 to thereby compute the driving torque of the front wheels 1 from both of them. It may however be arranged that the driving torque of the front wheels 1 is unequivocally obtained from the output torque of the engine 3 without detecting the established speed stage, because it is the first-speed stage that is established at the time of starting the vehicle.

An explanation has so far been made about an embodiment in which the present invention is applied to a four-wheel drive vehicle whose front wheels 1 are driven by the engine 3 and the rear wheels 2 are driven by the electric motor 5. The present invention may of course be similarly applied to a vehicle in which the rear wheels are driven by the engine and the front wheels are driven by the electric motor.

As can be seen from the above explanations, according to the present invention, the purpose of using the electric motor can be limited to the assistance in starting the vehicle on a road having a low coefficient of friction $\mu$. Therefore, even if an inexpensive DC brush motor is used as the electric motor, there is no problem in the durability. In addition, the assistance in starting of the vehicle can be automatically made, with the result that the vehicle can be used with good maneuverability or operability.

It is readily apparent that the above-described front wheel- and rear wheel-drive vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A front-wheel-drive and rear-wheel-drive vehicle in which one of either a set of front wheels or a set of rear wheels are driven by an engine and the other set of wheels thereof are driven by an electric motor, wherein said electric motor is operated when said vehicle starts, said vehicle comprising:

means for detecting a driving torque of the set of engine-driven wheels; and control means for prohibiting operation of said electric motor when the driving torque detected during start-up of said vehicle exceeds a predetermined value.

2. A front-wheel-drive and rear-wheel-drive vehicle according to claim 1, wherein said predetermined value is set to a lower limit value of the driving torque applied to the set of engine-driven wheels at vehicle start-up only by the drive of the set of engine driven wheels an acceleration above a predetermined level.

* * * * *